(12) United States Patent  
Guthridge

(10) Patent No.: US 8,850,290 B2  
(45) Date of Patent: Sep. 30, 2014

(54) ERROR RATE THRESHOLD FOR STORAGE OF DATA

(71) Applicant: International Business Machines Corporation, Armonk, NY (US)

(72) Inventor: D. Scott Guthridge, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 13/673,657

(22) Filed: Nov. 9, 2012

(65) Prior Publication Data

US 2014/0136907 A1 May 15, 2014

(51) Int. Cl.
  *G11C 29/00* (2006.01)
  *G06F 11/07* (2006.01)
(52) U.S. Cl.
  CPC .................................... *G06F 11/076* (2013.01)
  USPC ............................................. 714/769; 714/42
(58) Field of Classification Search
  CPC ... G06F 3/0613; G06F 3/0659; G11C 16/349; G11C 29/88
  USPC ...................... 365/185.04; 711/111; 710/107; 702/182; 714/5, 52, 769, 42
  See application file for complete search history.

(56) References Cited

U.S. PATENT DOCUMENTS

| | | | | |
|---|---|---|---|---|
| 5,574,856 | A * | 11/1996 | Morgan et al. | 714/52 |
| 5,668,971 | A * | 9/1997 | Neufeld | 711/111 |
| 6,757,767 | B1* | 6/2004 | Kelleher | 710/107 |
| 7,243,043 | B2* | 7/2007 | Shin | 702/182 |
| 2005/0286298 | A1* | 12/2005 | Hyvonen et al. | 365/185.04 |
| 2006/0005073 | A1* | 1/2006 | Clifton et al. | 714/5 |

* cited by examiner

*Primary Examiner* — David Ton
(74) *Attorney, Agent, or Firm* — Cantor Colburn LLP; Yusuke Kanehira

(57) ABSTRACT

Embodiments of the invention relate to calculation of error rate for data storage which includes determining a completion status of a read operation of data stored in a storage device, the completion status being one of at least partially complete or not complete. The fault monitoring count is incremented based on the completion status being not complete. The fault monitoring count is decreased based on the completion status being at least partially complete. The fault monitoring count being decreased according to a value based on the number of bytes successfully read. The error rate indicator value is being calculated based on an exponential decay rate related to the number of bytes read. The fault monitoring count threshold is monitored every time the fault monitoring count is incremented and the storage device is identified as faulty once the threshold limit is exceeded.

20 Claims, 8 Drawing Sheets

Example Data Fault Monitoring Count Parameters and Error Rate
vs. Number of Days Until Fault Detection

| Parameters | | | Relative Error Rate | | | | | | |
|---|---|---|---|---|---|---|---|---|---|
| Limit | GiB:Err | 2.5 | 3.2 | 4.0 | 5.0 | 6.3 | 7.9 | 10.0 |
| 5 | 26991 | | | | | | 7.9 | 10.0 |
| 6 | 28193 | | | | | 41 | 21 | 14 |
| 7 | 30581 | | | | 67 | 32 | 21 | 15 |
| 8 | 33192 | | | | 52 | 32 | 22 | 16 |
| 9 | 35856 | | | 83 | 53 | 33 | 24 | 17 |
| 10 | 38459 | | | 84 | 52 | 36 | 26 | 19 |
| 11 | 40845 | | 178 | 88 | 54 | 38 | 28 | 21 |
| 12 | 43147 | | 153 | 85 | 57 | 41 | 30 | 23 |
| 13 | 45274 | | 147 | 88 | 60 | 43 | 32 | 24 |
| 14 | 47338 | 763 | 145 | 91 | 63 | 46 | 34 | 26 |
| 15 | 49162 | 328 | 147 | 95 | 67 | 49 | 37 | 28 |
| 16 | 50997 | 290 | 150 | 99 | 70 | 52 | 39 | 30 |
| 17 | 52598 | 279 | 155 | 103 | 74 | 55 | 41 | 31 |
| 18 | 54205 | 273 | 159 | 108 | 77 | 57 | 43 | 33 |

FIG. 4

ERROR RATE THRESHOLD FOR STORAGE OF DATA

This invention was made with Government support under HR0011-07-9-0002 awarded by Defense Advanced Research Projects Agency (DARPA). The Government has certain rights in this invention.

BACKGROUND

Embodiments of the invention relate to calculating an error rate threshold relating to storage device.

The growing dependence on retrieval and storage of information has increased a need for providing reliable data storage devices. Unfortunately, data storage devices can be damaged through a number of failures. These conditions can include heat, water, impacts, power interruptions and viruses. In addition, frequent use of these devices can subject them to wear, causing the need for replacement prior to the end of their estimated manufactured life. Data recovery from a damaged device can be costly, even if possible at all.

BRIEF SUMMARY

Embodiments include a method for calculation of error rate for data storage. The method includes determining a completion status of a read operation of data stored in a storage device, the completion status being one of at least partially complete or not complete. The fault monitoring count is incremented based on the completion status being not complete. The fault monitoring count is decreased based on the completion status being at least partially complete. The fault monitoring count being decreased according to a value based on the number of bytes successfully read. The error rate indicator value is being calculated based on an exponential decay rate related to the number of bytes read. The fault monitoring count threshold is monitored every time the fault monitoring count is incremented and the storage device is identified as faulty once the threshold limit is exceeded.

The method includes determining a completion status of a read operation of data stored in a storage device, the completion status being one of at least partially complete or not complete and incrementing a fault monitoring count based on the completion status not being complete. The fault monitoring count is decreased by a value based on the completion status being at least partially complete. The error rate indicator value is based on a number of bytes successfully read. The error rate indicator value is being calculated based on an exponential decay rate related to the number of bytes read. The method also includes monitoring of a fault monitoring count threshold every time the fault monitoring count is incremented and flagging the storage device as faulty once the threshold limit is exceeded.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

FIG. 4 is a tabular depiction, showing relationship between error rate and time required for fault detection;

DETAILED DESCRIPTION

Determining when a storage device should be taken out of service is a challenging task. In one approach, a solution can be presented that monitors error rate and allows the device to be taken out of service when an uncorrectable read error rate is deemed too high. However, when operating system software or application software such as database systems are involved the problem gets even more complicated, especially in sophisticated settings such as those using self-monitoring, analysis and reporting technologies (S.M.A.R.T) and RAID (redundant array of independent disks). RAID is a storage technology that combines multiple disk drive components into a logical unit. RAID is a data storage scheme that can divide and replicate data among multiple physical drives and can be accessed by the operating system as one single drive.

Error detection can be used in a variety of manners depending which type of storage device is used. For example, RAID implements a system of checksums in the operating system to flag errors. A checksum of a message is a modular arithmetic sum of message code words of a fixed word length (e.g., byte values). The sum may be negated by means of a ones-complement operation prior to transmission to detect errors resulting in all-zero messages. Checksum schemes include parity bits, check digits, and longitudinal redundancy checks. For example, under checksum, a parity bit is designed to show when a disk fails. A parity bit is a bit that is added to a group of source bits to ensure that the number of set bits in the outcome is even or odd. These are only a few examples of error detection tools that can be utilized as can be appreciated by those skilled in the art. Other methods such as a cyclic redundancy check (CRC), cryptographic hash functions and the like can also be used for error-detecting code.

No matter what type of error detection is used, a way to determine if a device has to be taken out of the service is through the use a counter that is tied with the error correction code that is being implemented. In such a case, every time the error detection code flags an error, the counter is incremented until it reaches a certain threshold value. Once the threshold value has been exceeded, the device can then be deemed as faulty and taken out of service. The difficulty, however, is with determining the threshold value for maximum tolerated number of error events in a manner that is not arbitrary. To enable a threshold value that is not arbitrarily set, a clear relationship needs to be established between the count and the error rate.

In addition, error rate is only one variable that can affect the need for taking a device out of the service. A better solution is to tie error thresholds quantitatively to specified bit error rates as well to other relevant factors such as expected storage element lifetime, false positive rates, device sensitivities and other such factors.

Figure 1:
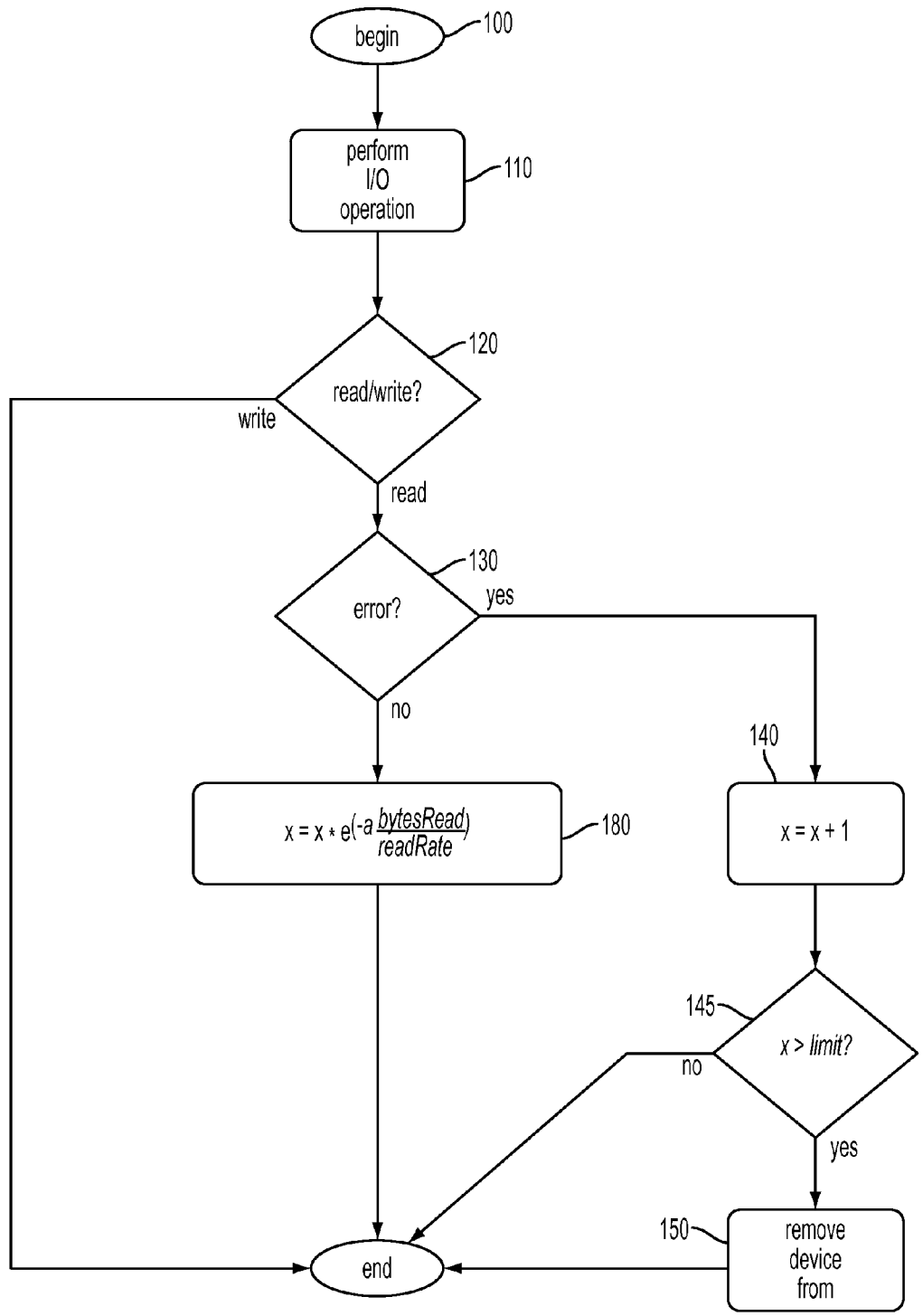
FIG. 1 is a process flow for an error measure algorithm in accordance with an embodiment.

FIG. 1 is a flowchart illustration of a methodology used for one embodiment of the invention. In such an embodiment, a "fault monitoring" value is determined to establish a quantitative correlation between different factors that can affect serviceability of a device as will be presently discussed in more details.

The fault monitoring value is calculated based on a number of factors. One factor is an error event. Each error event will add a particular value to the total fault monitoring value associated with a specified element or a device. Error events increment the fault monitoring value by a specified amount. In one embodiment, the value added for each error event is equal to one. However, successful reads from a storage device decreases the value by a particular amount as well. In one embodiment, the Poisson theory is used for decrementing the value using an exponential decay factor, as will be discussed later. A Poisson process normally counts the number of events and the time that these events occur in a given time interval. The time between each pair of consecutive events (inter-arrival times) has an exponential distribution and each of these inter-arrival times is assumed to be independent of other inter-arrival times.

Referring now to the flow process of FIG. 1, the flow process starts at 100 and proceeds to the performance of a normal input-output operation such as shown in block 110. This operation can include a read or write operation as shown in block 120. When a read operation is being performed, one or more error correction schemes can be utilized to determine if an error has ensued as shown in block 130. If an error has occurred, in this embodiment, the fault monitoring value will be incremented by a value of one as shown in block 140. It is then checked and determined if such incrementing of the value will cause it to go beyond a particular threshold value as shown in block 145. As discussed earlier, a number of error detection algorithms such as checksums and parity bits can be used as tools to enable error detection.

Figure 3:
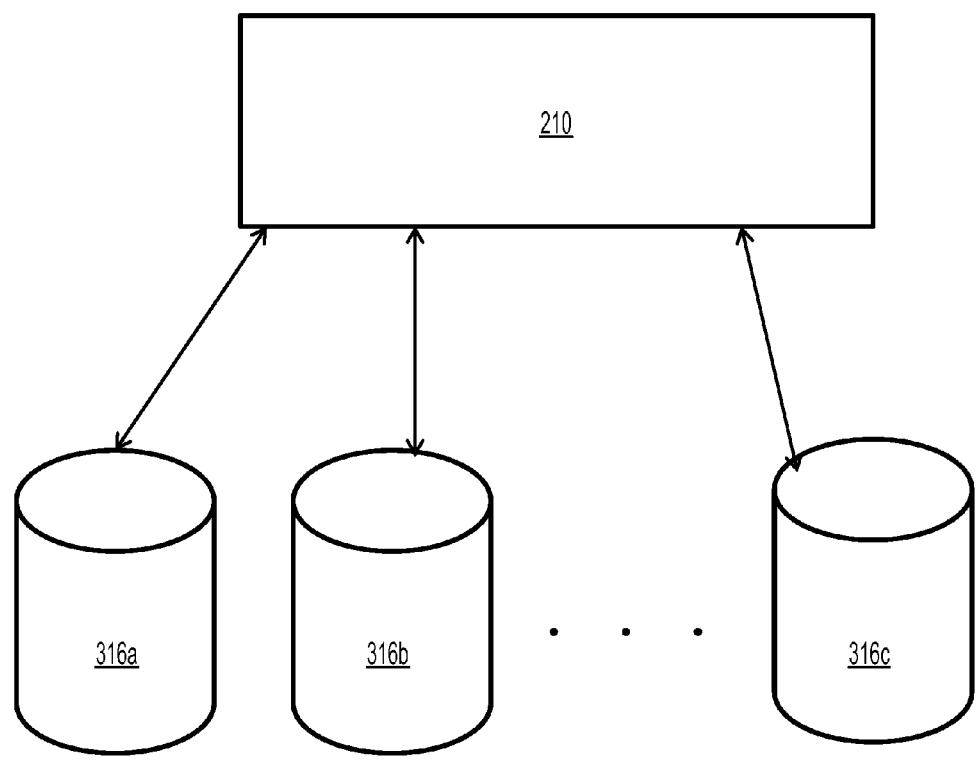
FIG. 3 depicts a block diagram of the system as per embodiment of FIG. 2, utilizing a plurality of storage device in accordance with an embodiment.

If the threshold value is exceeded, the device is then deemed faulty and flagged to be taken out of service as shown in block 150. In one embodiment, an indicator will be provided to mark the need for servicing or retirement of the particular device. The indicator can include and be accompanied by a log that further indicates where the errors had occurred so if needed individual elements can be replaced instead of the entire storage device as appropriate. In alternate embodiments, more than one storage device can be used and a fault monitoring counter can be provided for each storage device, such as shown in FIG. 3. In one embodiment, for example, a floating or fixed point number can be maintained for each storage device. The indicator, in that case, can be shared by all devices and be enabled to pin point the device in question that had exceeded the threshold limit. Alternatively, an individual indicator can be provided individually for each device.

In cases where no error has been detected after a successful read, the fault monitoring value is then decreased by a particular value as shown in block 180 (this rate as shown in the flow chart is derived to be x=x*e$^{(-\alpha\ bytesRead/readRate)}$ as will be discussed later in more details). In one embodiment, each successful read operation subtracts a value proportional to the current value times the number of bytes successfully read (i.e. exponential decay). If the value exceeds a certain limit, the device is flagged as faulty as discussed above.

In one embodiment, the formula shown in block 180 is partly calculated using the Poisson theory combined with concepts derived from the Campbell's shot noise theory. Campbell's theory evaluates the mean-square fluctuation in the output of a system whose input is subject to a random succession of equal strength impulses. The two parameters, namely the threshold value (limit value) parameter and the parameter associated with the value for a successful read, can partly be calculated using the Poisson-Campbell concept and partly based on a number of other factors. These factors can include expected useful lifetime of a particular device, a confidence value associated with a rate of false positive rates, a sensitivity value in view of a time component regarding fault detection and a maximum allowable read or an average input-output (I/O) read rate. The importance of some of these factors will become clear by referring to tabular and/or graphical illustrations of FIGS. 4 through 8.

In FIG. 4, for example, one embodiment is provided as way of example that shows the relationship for error rate versus the number of days until fault detection was made for a particular device. In this example, setting the relative error rate to 2.5, can mean that no errors will be detected for more than 13 days as compared to setting the rate at a value of 10 where an error will be detected in 5 days or less. Consequently, as portrayed by this example, a tradeoff emerges between setting certain values too high or too low.

Figure 5:
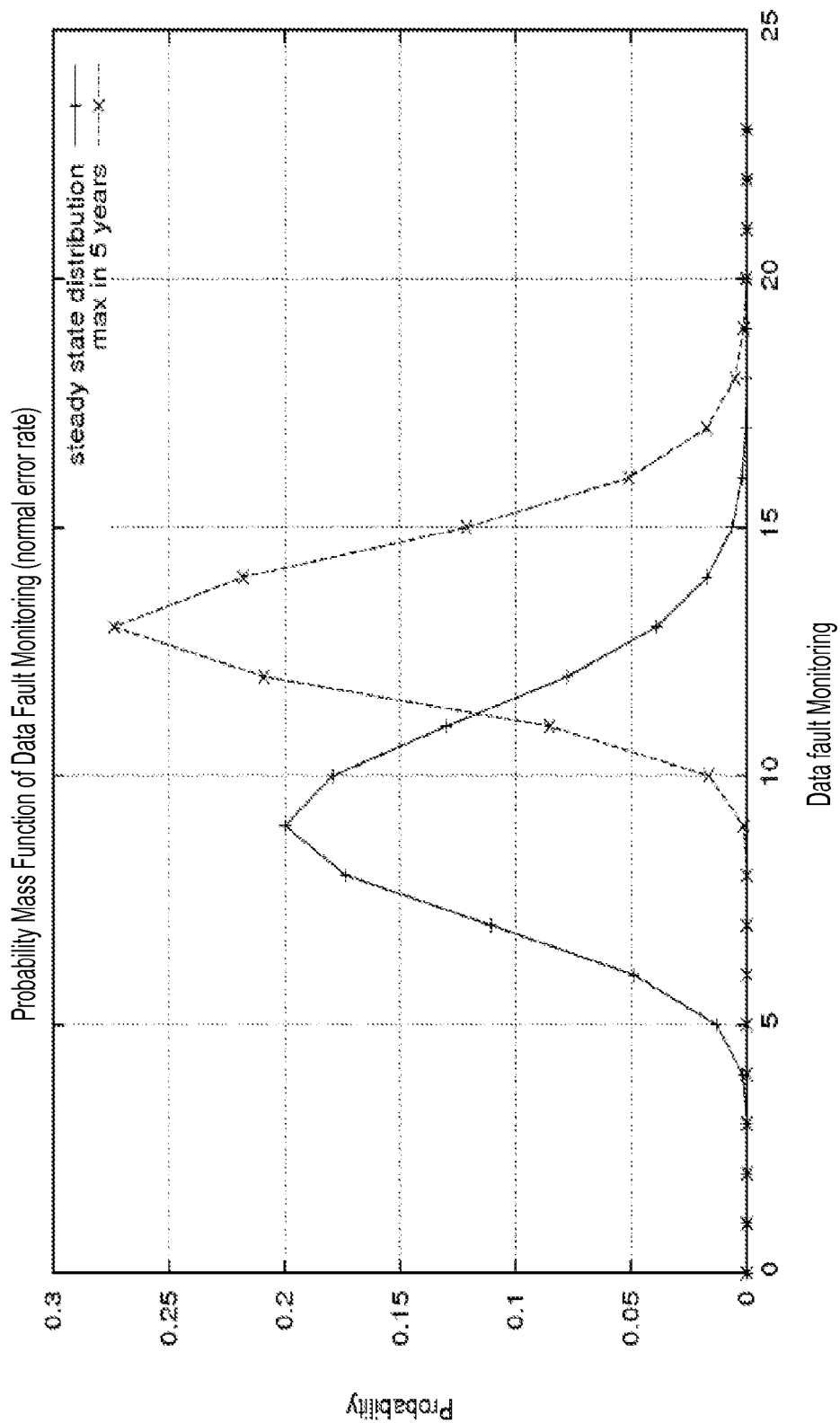
FIG. 5 is a graphical depiction of a probability of error in accordance to fault monitoring data.
Figure 6:
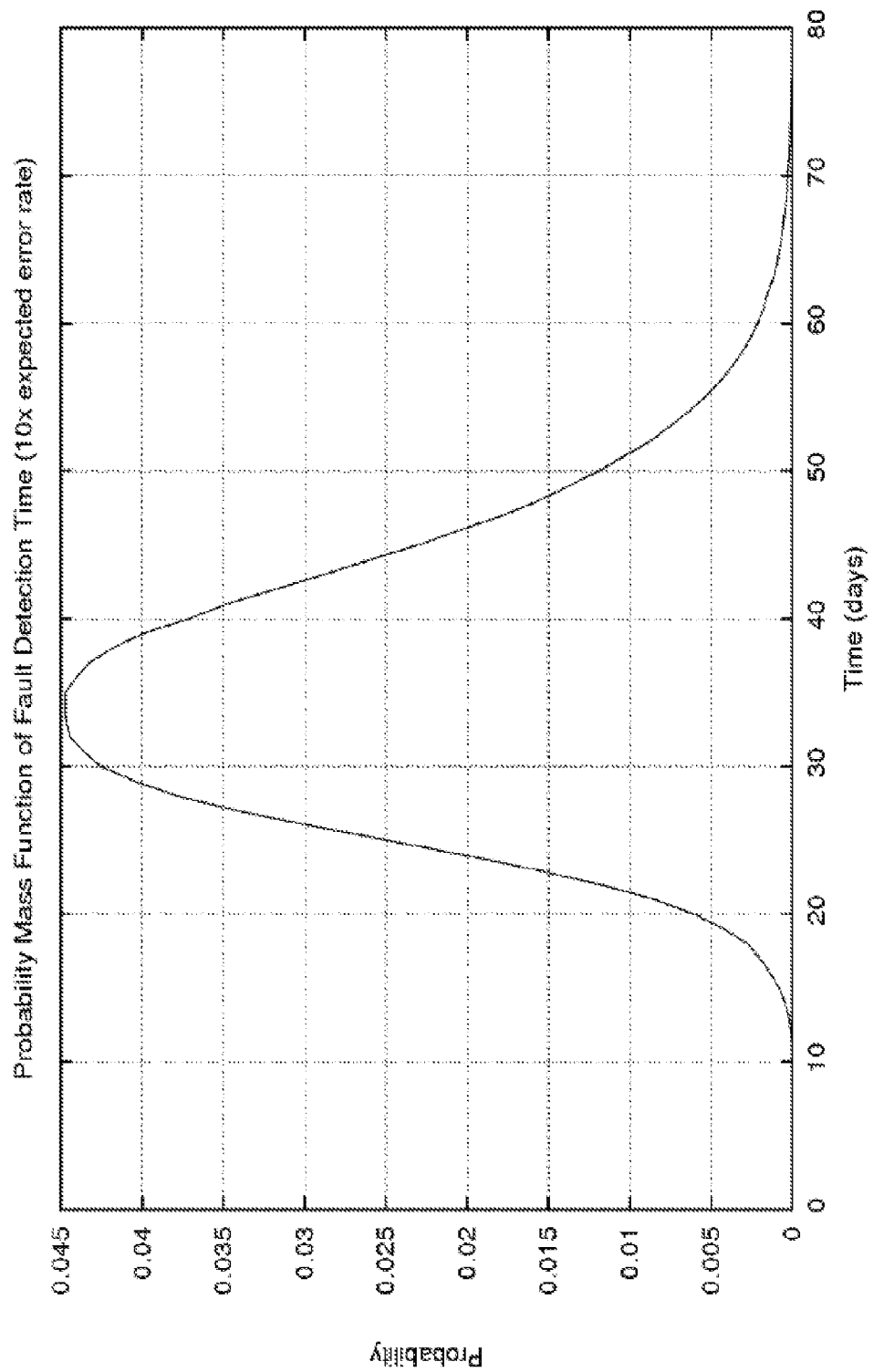
FIG. 6 is a graphical depiction of probability relationship as a function of fault detection time.

FIGS. 5 and 6 provide graphical illustration for relationship between a probability of failure and the value for data fault monitoring. The solid line in the graph is actual data whereas the dotted curve provides an estimated value distribution for a five year estimate relating to a particular device. FIG. 6 provides a similar distribution but establishes the relationship for probability of error given a particular number of days for a particular device.

Figure 7:
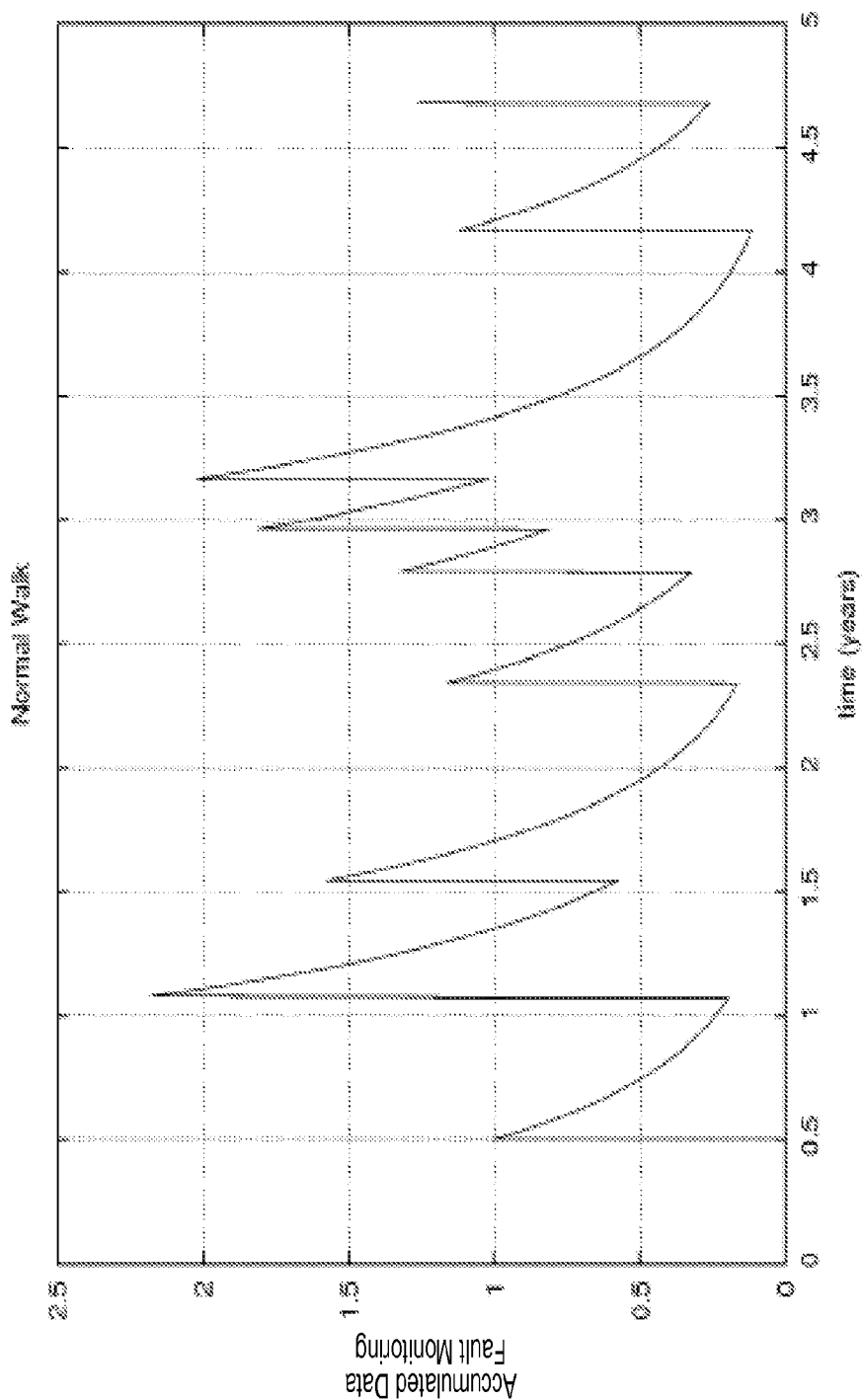
FIG. 7 is a graphical depiction of a normal accumulated fault monitoring data in relationship to a function of time.
Figure 8:
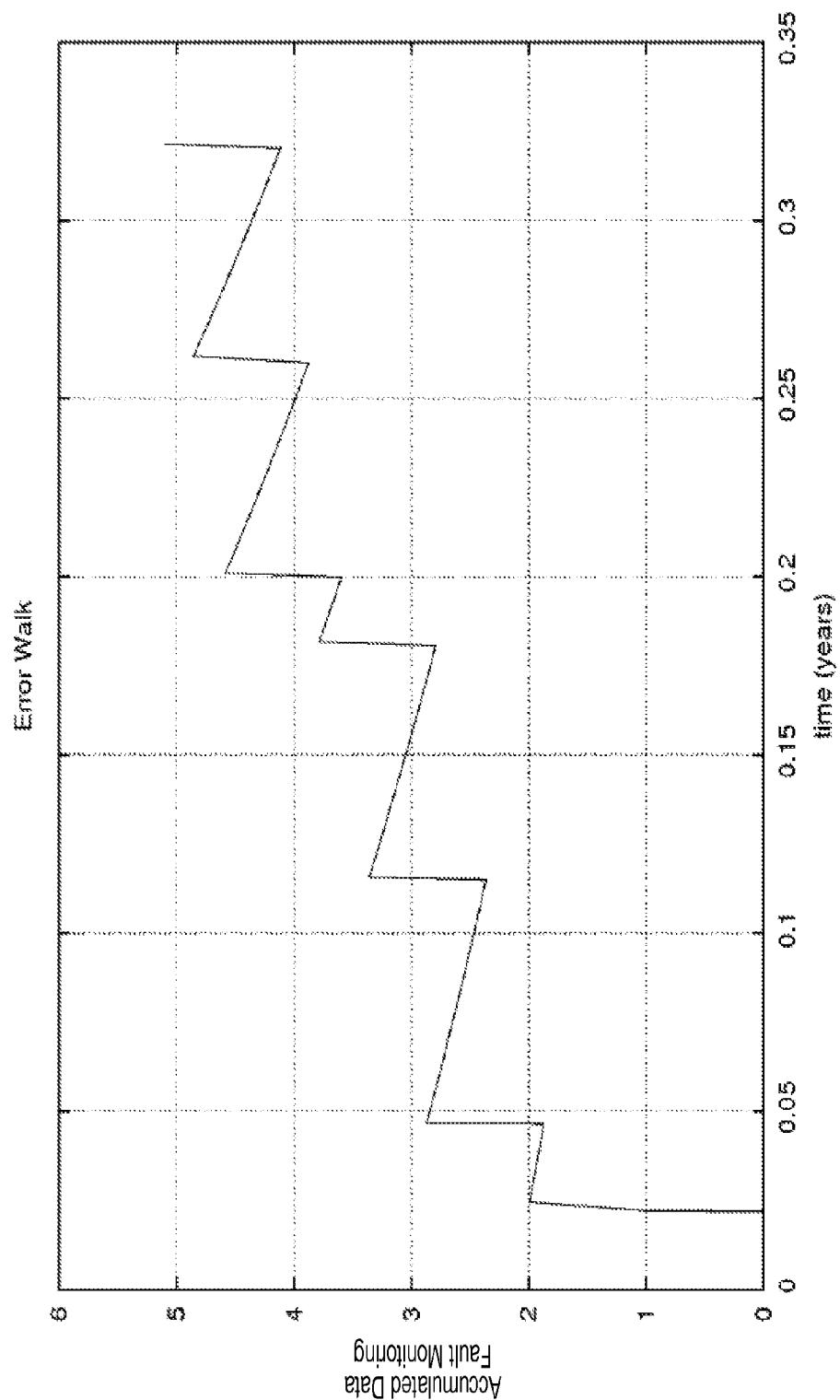
FIG. 8 is a graphical description of accumulated fault monitoring data with error in as a function of time.

FIGS. 7 and 8 provide graphical illustration to calculated values for fault monitoring in normal and error conditions respectively as a function of time. Again the intent of the graphical relationship is to indicate the importance of tradeoffs and real time actual results and relationships.

Taking the actual results from the examples provided in FIGS. 4 through 8 in view of the modified calculations of Poisson and Campbell's theories, a calculation can be provided both for the two parameters indicated in embodiment of FIG. 1 which provides for the limit (threshold) value and the adjustment to the "fault monitoring" value for successful data reads. In one embodiment, as will be provided in the discussion below: x is the current error measure (fault monitoring) for the storage device; readRate is the expected read rate in bytes per year and α is the decay rate in radians per year and limit is the threshold value for taking a device out of service; and X is a random variable representing the error measure of a storage device and $S_k$ is a random variable representing the time since a k'th event back in time. Taking all this in consideration, the expected value of X immediately after an error event can then be calculated as:

$$E[X]=E[1+e^{-\alpha S_1}+e^{-\alpha S_2}+\ldots+e^{-\alpha S_k}] \quad (1)$$

By linearity of expectation, this can be rewritten as:

$$E[X] = 1 + E[e^{-\alpha S_1}] + E[e^{-\alpha S_2}] + \ldots + E[e^{-\alpha S_k}] \quad (2)$$

$$= 1 + \sum_{k=1}^{\infty} E[e^{-\alpha S_k}] \quad (3)$$

The alpha and limit constants can be calculated in a number of ways including using random distributions. Put simply, a table of candidate values can be established that can allow a desired tradeoffs such as false-positive rate for storage per device in relation to a set of given characteristics such as expected lifetime, I/O rate, and specified bit-error-rate which can be adjusted depending on the type of device. This is similar to what was provided in FIGS. 4 through 8. Taking this and the Poisson's process values in consideration, the $S_k$ variables follow a gamma distribution with shape factor k:

$$S_k \sim \Gamma_{pdf}\left(t; k, \frac{1}{r}\right) \quad (4)$$

$$\sim \frac{e^{-rt} t^{k-1} r^k}{\Gamma(k)} \quad (5)$$

Where t is the time (in years) and r is the average error rate in number of error events per year. Substituting definition of expectation into equation (3) and simplifying:

$$E[X] = 1 + \sum_{k=1}^{\infty} \int_0^{\infty} e^{-\alpha t} \frac{e^{-rt} t^{k-1} r^k}{\Gamma(k)} dt \quad (6)$$

$$= 1 + \sum_{k=1}^{\infty} \left(\frac{r}{r+\alpha}\right)^k \quad (7)$$

$$= 1 + \frac{r}{\alpha} \quad (8)$$

Equation (8) is related to Campbell's theorem. Let x be a particular value of X and solve for r in the following manner:

$$x = 1 + \frac{r}{\alpha} \quad (9)$$

$$r = \alpha * (x - 1) \quad (10)$$

Converting to the bit error rate:

$$bitErrorRate = \frac{r}{8 * readRate} \quad (11)$$

$$= \frac{\alpha * (x_{after} - 1)}{8 * readRate} \quad (12)$$

This leads to an unbiased estimate of the bit error rate is x is sampled immediately after an error event. If x were sampled immediately before an error event, the bit error estimate would become:

$$bitErrorRate = \frac{\alpha * x_{before}}{8 * readRate} \quad (13)$$

Between error events, it can be assumed that x is the geometric mean of $x_{after}$ and $x_{before}$:

$$x = \sqrt{x_{after} * x_{before}} \quad (14)$$

Solving for $x_{after}$:

$$x_{before} = x_{after} - 1 \quad (15)$$

$$x_{after} = \frac{1 + \sqrt{1 + 4x^2}}{2} \quad (16)$$

Substituting this now into equation (12):

$$bitErrorRate = \frac{\alpha * \left(\frac{1 + \sqrt{1 + 4x^2}}{2} - 1\right)}{8 * readRate} \quad (17)$$

$$= \frac{\alpha \left(\sqrt{1 + 4x^2} - 1\right)}{16 * readRate} \quad (18)$$

Applying the concept of this formula to a successful read, the number of bytes read successfully is also determined in a final calculation of a value or parameter that would affect x. In other words, while every unsuccessful read increments the fault monitoring value by some increment, every successful read will decrease the value by a value based primarily on the number of successful byte reads. Therefore, when determining the value associated with a successful read, as indicated in FIG. 1, the fault monitoring will be decreased by:

$$x = x * e^{(-\alpha \; bytesRead/readRate)}$$

which is the rate shown and discussed previously in relation to block 180 in FIG. 1.

In addition, it should be noted that the "fault monitoring" metric (x) of a storage device when first put into service, can be initialized to some starting value. In one embodiment, the starting or initial value can be set to zero but in alternate embodiments, this value can be further adjusted and other values could also be used (for example, the expected "fault monitoring" of a good storage device).

Figure 2:
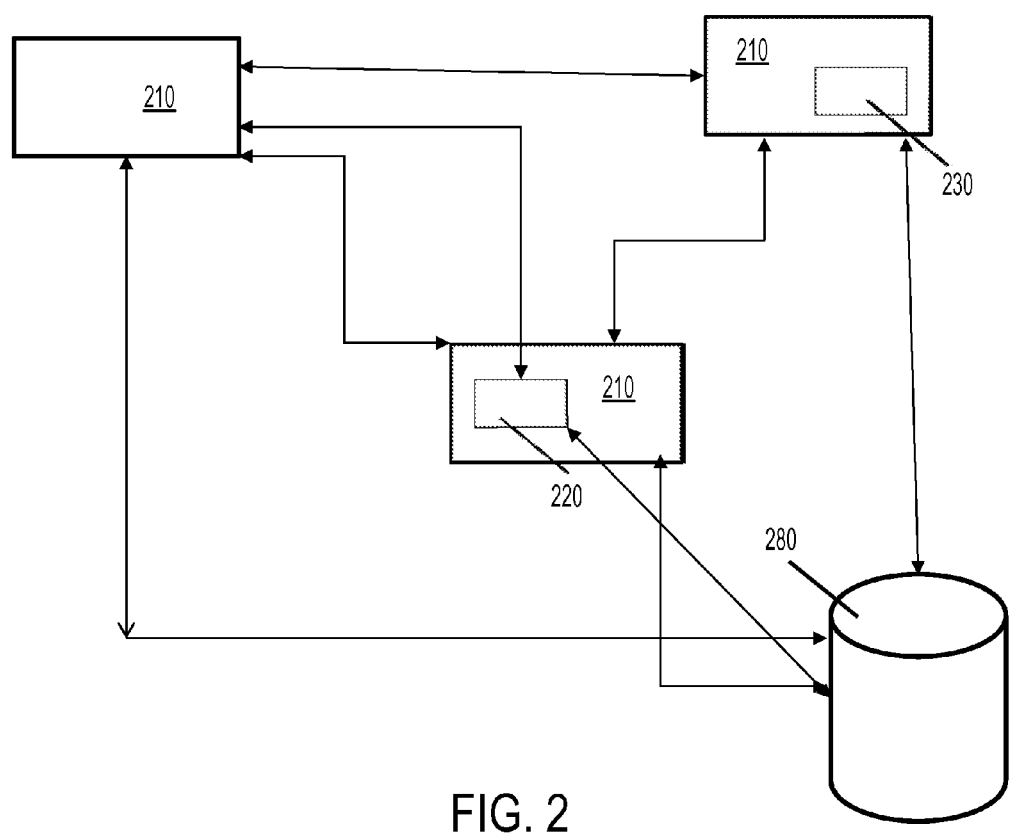
FIG. 2 depicts a block diagram of a system that can be used in accordance with the embodiment of FIG. 1.

FIG. 2 illustrates a block diagram of a system that can be used in conjunction with the embodiment as discussed in FIG. 1. As illustrated in FIG. 2, the system includes a plurality of nodes 210 that are in processing communication with one another. Each node 210 can represent a variety of digital devices, such as but not limited to mobile devices, personal computers, servers or others such devices can include one or more processors 230. In addition, the nodes 210 can further include display, input/output interfaces, printers or other components as can be appreciated by those skilled in the art. Furthermore, each node can have internal memory 220 or be in communication with one or more external storage device(s) 280. The processing communication can be enabled through wired or wireless processing or other alternate means. In addition, the processing means through which the nodes 210 are in communication with one another are varied as can be appreciated by those skilled in the art. For example, in one embodiment, one or more nodes 210 can be in processing communication with one another using the internet or world wide web but in other embodiments they can be part of a secured and privatized network.

In one embodiment, as shown in FIG. 3, a sample node 210 that can be in one example a host computer, is in processing communication with N number of storage devices. The storage devices are enumerated by storage device zero being represented by 316a, storage device one by 316b, through storage device N-1 represented by 316c. Any of the storage devices used can be either a random access memory device (RAM) or a read only memory device (ROM) and can provide internal, external or removable memory storage. Each device can represent the same or different types of storage devices including but not limited to hard disks, tape drives and tape libraries, optical devices and drives such as read only or rewriteable compact disks (CD/ROMs and CD/RWs) and digital versatile disks (DVDs), optical jukeboxes, disk arrays and floppy disk drives and other removable media drives such as flash drives. There are many other types of storage, internal and external and removable, that can also be available as can be appreciated by those skilled in art. The devices can each then be monitored as discussed previously and flagged when need to be serviced or taken out of use.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   determining a completion status of a read operation of data stored in a storage device, said completion status being partially complete or not complete;
   incrementing a fault monitoring count every time a read operation has not successfully completed, based on said completion status being not complete;
   decreasing said fault monitoring count by an error rate indicator value based on said completion status being at least partially completed, said partial completion status indicating that at least some bytes were successfully read; said fault monitoring count being decreased according to a value based on a number of bytes successfully read in said read operation, and said error rate indicator value being calculated based on an exponential decay rate related to said number of bytes read;
   monitoring a fault monitoring count threshold every time said fault monitoring count is incremented; and
   identifying said storage device as faulty once said threshold limit is exceeded.

2. The method of claim 1, wherein exceeding said threshold limit identifies said storage device to be removed from use.

3. The method of claim 2, wherein said error rate indicator parameter is calculated based on a formula, such that x is a current error measure (fault monitoring) for said storage device; readRate is the expected read rate in bytes per year and α is the decay rate in radians per year and limit is the threshold value for taking a device out of service; and said formula comprising:

$$x=x*e^{(-\alpha bytesRead/readRate)}.$$

4. The method of claim 3, wherein said threshold limit is set to a preselected value.

5. The method of claim 4, wherein said threshold limit is calculated based on a specified bit error rate.

6. The method of claim 5, wherein said threshold limit is also calculated based on expected life expectancy of said storage device.

7. The method of claim 6, wherein said threshold limit is also calculated based on a manufactured error rate for said storage device.

8. The method of claim 7, wherein said threshold limit is calculated based on a confidence value.

9. The method of claim 8, wherein said confidence value is determined by rate of false positive error rates for said storage device.

10. The method of claim 9, wherein said threshold limit is calculated based on a determination of a time to fault value detection.

11. The method of claim 10, wherein said time to fault value detection is adjusted to a preselected sensitivity rate.

12. The system of claim 1, wherein a plurality of storage devices are provided and a fault monitoring count is established in relation to each storage device.

13. The method of claim 12, wherein, a different threshold limit is established for each storage device.

14. The method of claim 13, wherein said error rate indicator parameter is calculated based on a formula, when x is a current error measure (fault monitoring) for said storage device; readRate is the expected read rate in bytes per year and α is the decay rate in radians per year and limit is the threshold value for taking a device out of service, said formula comprising:

$$x=x*e^{(-\alpha\ bytesRead/readRate)}.$$

15. The method of claim 13, wherein said threshold limit for each storage device is calculated based on a maximum allowable bit error rate for said storage device.

16. The method of claim 13, wherein said threshold limit for each storage device is calculated based on an average input-output read rate.

17. The method of claim 13, wherein said threshold limit for each storage device is calculated based on an expected life expectancy of each said storage device.

18. The method of claim 13, wherein said threshold limit for each storage device is calculated based on a confidence value.

19. The method of claim 13, wherein said threshold limit for each storage device is calculated based on an estimated time prior to a first fault detection for said storage device.

20. The method of claim 19, wherein said confidence value is determined by rate of false positive error rates for said storage device.

* * * * *